(12) United States Patent
Nino

(10) Patent No.: US 7,088,595 B2
(45) Date of Patent: Aug. 8, 2006

(54) REVERSIBLE BUCK-BOOST CHOPPER CIRCUIT, AND INVERTER CIRCUIT WITH THE SAME

(75) Inventor: Shinichi Nino, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/092,731

(22) Filed: Mar. 30, 2005

(65) Prior Publication Data

US 2005/0218876 A1 Oct. 6, 2005

(30) Foreign Application Priority Data

Mar. 31, 2004 (JP) ............................ 2004-106002

(51) Int. Cl.
*H02M 3/335* (2006.01)
*H02M 7/5387* (2006.01)

(52) U.S. Cl. ........................................ 363/17; 363/321

(58) Field of Classification Search .................. 363/16, 363/17, 40, 56.01, 56.02, 131, 132
See application file for complete search history.

(56) References Cited

U.S. PATENT DOCUMENTS 5,859,771 A * 1/1999 Kniegl ....................... 363/132
5,923,547 A * 7/1999 Mao ............................. 363/52
5,946,200 A * 8/1999 Kim et al. ..................... 363/17
6,310,785 B1 * 10/2001 Ayyanar et al. ............... 363/17
6,483,724 B1 * 11/2002 Blair et al. .................... 363/17
6,590,360 B1 7/2003 Hirata et al.
2001/0026141 A1 10/2001 Hirata et al.

FOREIGN PATENT DOCUMENTS

JP     A 2001-271729     10/2001
JP     2005137125 A   *  5/2005

* cited by examiner

*Primary Examiner*—Adolf Berhane
(74) *Attorney, Agent, or Firm*—Oliff & Berridge, PLC

(57) ABSTRACT

In a reversible buck-boost chopper circuit, a first half-bridge circuit has a first switching element with a high-side main electrode connected to a positive electrode of a DC power source, and a second switching element is connected to the first switching element at a first output terminal. A low-side main electrode of the second switching element is connected to a negative electrode of the DC power source. A second half-bridge circuit has a third switching element with a high-side main electrode connected to a high-side terminal of the load. A fourth switching element of the second half-bridge circuit is connected to the third switching element at a second output terminal. A low-side main electrode of the fourth switching element is connected to a low-side terminal of the load and the negative electrode. A reactor is connected between the first and second output terminals.

14 Claims, 11 Drawing Sheets

BOOST-AND-FORWARD POWER TRANSMISSION MODE

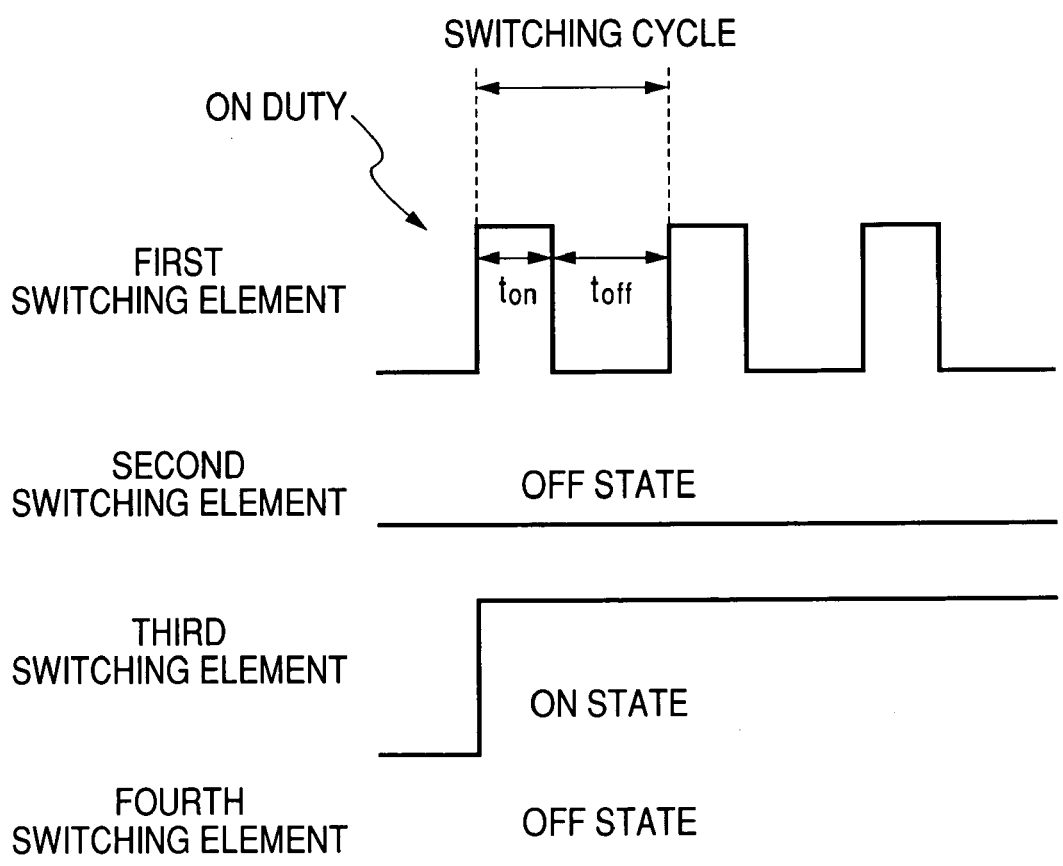

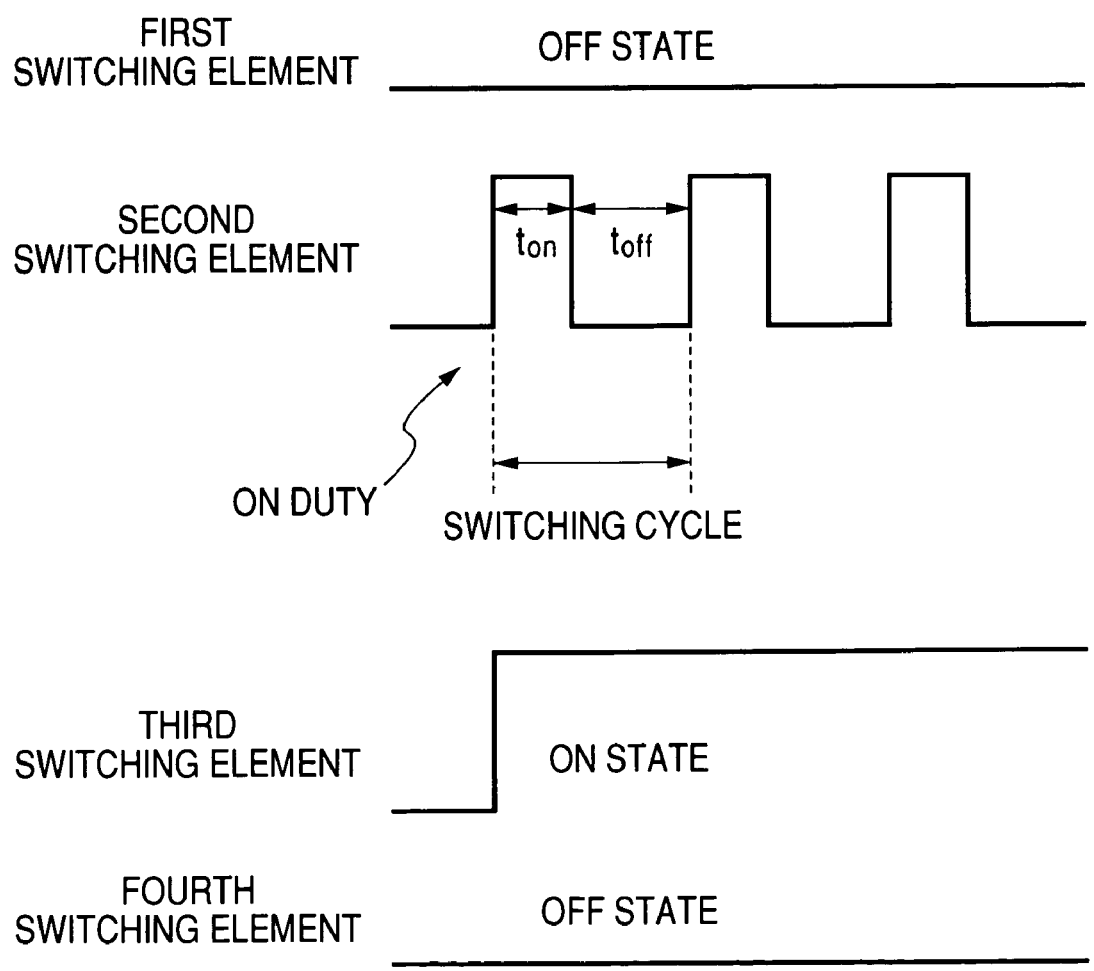

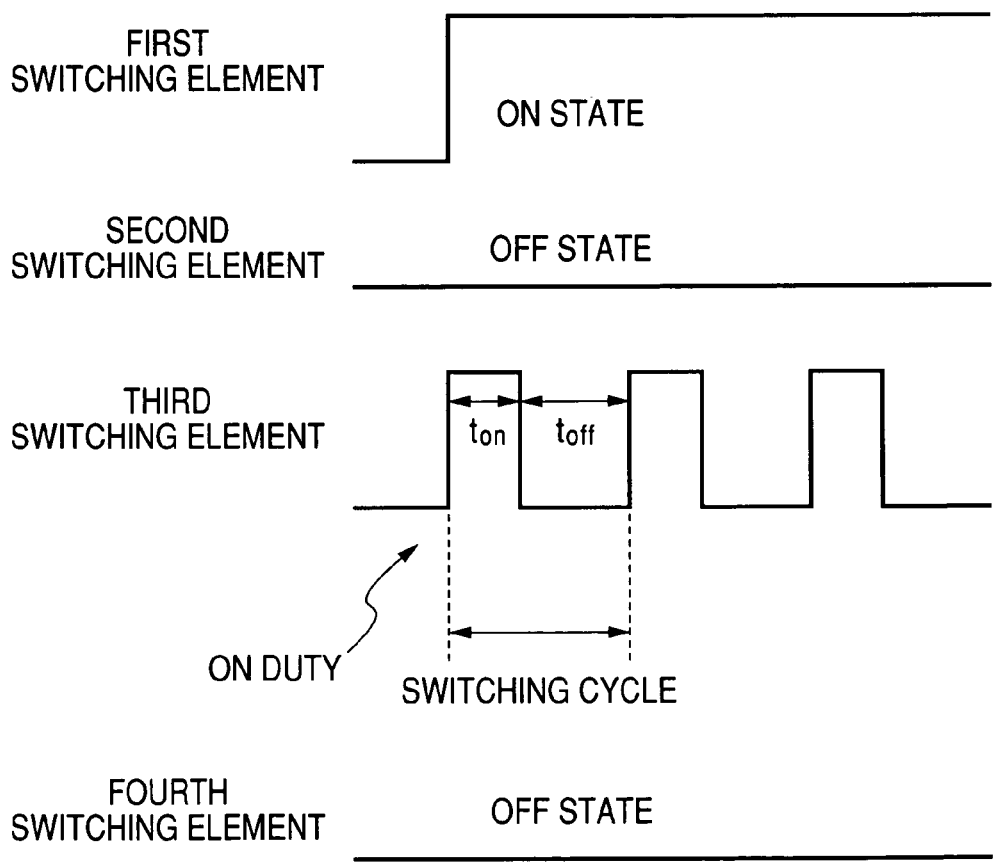

US 7,088,595 B2

REVERSIBLE BUCK-BOOST CHOPPER CIRCUIT, AND INVERTER CIRCUIT WITH THE SAME

CROSS REFERENCE TO RELATED APPLICATION

This application is based on Japanese Patent Application 2004-106002 filed on Mar. 31, 2004 and claims the benefit of priority therefrom, so that the descriptions of which are all incorporated herein by reference.

BACKGROUND OF THE INVENTION

1. Field of the Invention

The present invention relates to a reversible buck-boost chopper circuit and an inverter circuit with the same. More particularly, the present invention can be adopted for drive control of electric traction motors of a vehicle, each of which provides drive torque.

In hybrid vehicles or fuel cell electric vehicles, an increase of a power supply voltage, that is, a direct-current (DC) battery voltage is desirable to reduce copper loss and/or switching loss. So far, approximately 300 V has been an upper limit of the battery voltage in view of circumstances, such as higher battery costs.

In a hybrid vehicle or fuel cell electric vehicle, in order to use a DC power supply voltage higher than the battery voltage, a chopper type boost DC to DC converter, for example, is provided for boosting the DC power supply voltage. The boosted DC power supply voltage is converted into an alternating-cent (AC) voltage by an inverter composed of a three-phase PWM (Pulse Width Modulation) bridge circuit so that the AC voltage is applied to a high-voltage AC motor. The combination of the circuits of the chopper type boost DC to DC converter and the inverter, which is disclosed in U.S. Pat. No. 6,590,360 corresponding to Japanese Unexamined Patent Publication No. 2001-271729, has already been put to practical use. The combination of the circuits is referred to as "boosted inverter circuit" hereinafter.

The conversion efficiency of the boosted inverter circuit is a product of the conversion efficiency of the boost DC to DC converter and that of the inverter, resulting in greater power loss, such as switching loss, in the whole of the boosted inverter circuit to increase. The increase of the power loss may make it difficult to properly cool the boosted inverter circuit. In addition, the boosted inverter circuit requires both the boosted DC to DC converter and the inverter; this requirement may cause the boosted inverter circuit to increase in size and weight, deteriorating the installability of the boosted inverter circuit into a vehicle.

In order to solve the problems set forth above, it is possible to omit the boost DC to DC converter from the boosted inverter circuit to allow the inverter to directly convert the DC power supply (battery) voltage into a lower AC output voltage applied to an AC motor. This conventional configuration, however, increases output current; therefore, it may make conduction loss and switching loss increase. The increases of the conduction loss and the switching loss may make it difficult to properly cool the inverter circuit. In addition, the low output voltage makes field weakening difficult, which is necessary for controlling regenerating current when the AC motor is driven as a generator at a higher rotational speed.

Specifically, in the boosted inverter circuit technology for drive control of traction motors in a vehicle, it has been especially desirable to adopt a boost DC to DC converter with low losses; this boost DC to DC converter is capable of controlling power regenerated from a load to control breaking of a vehicle.

SUMMARY OF THE INVENTION

The present invention has been made on the background above so that at least one preferable embodiment of the present invention provides a reversible buck-boost chopper circuit which is capable of controlling a current transmitted to a load and that regenerated therefrom with low losses.

According to one aspect of the present invention, there is provided a reversible buck-boost chopper circuit connected between a DC power source and a load. The reversible buck-boost chopper circuit includes a first half-bridge circuit with a first output terminal. The first half-bridge circuit comprises a first switching element having a high-side main electrode connected to a positive electrode of the DC power source. The first half-bridge circuit comprises a second switching element connected to the first switching element in series at the first output terminal. The second switching element has a low-side main electrode connected to a negative electrode of the DC power source. The reversible buck-boost chopper circuit includes a second half-bridge circuit with a second output terminal. The second half-bridge circuit comprises a third switching element having a high-side main electrode connected to a high-side terminal of the load. The second half-bridge circuit comprises a fourth switching element connected to the third switching element in series at the second output terminal. The fourth switching element has a low-side main electrode connected to a low-side terminal of the load and the negative electrode of the DC power source. The reversible buck-boost chopper circuit includes a reactor connected between the first output terminal of the first half-bridge circuit and the second output terminal of the second half-bridge circuit.

According to another aspect of the present invention, there is provided an inverter circuit connected between a DC power source and a load. The inverter circuit comprises first and second reversible buck-boost chopper circuits. Each of the first and second reversible buck-boost chopper circuits comprises a first half-bridge circuit with a first output terminal. The first half-bridge circuit includes a first switching element having a high-side main electrode connected to a positive electrode of the DC power source. The first half-bridge circuit includes a second switching element connected to the first switching element in series at the first output terminal. The second switching element has a low-side main electrode connected to a negative electrode of the DC power source. Each of the first and second reversible buck-boost chopper circuits comprises a second half-bridge circuit with a second output terminal. The second half-bridge circuit includes a third switching element having a high-side main electrode; and a fourth switching element connected to the third switching element in series at the second output terminal. The fourth switching element has a low-side main electrode. Each of the first and second reversible buck-boost chopper circuits comprises a reactor connected between the first output terminal of the first half-bridge circuit and the second output terminal of the second half-bridge circuit. The high-side main electrode of the first reversible buck-boost chopper circuit is connected to a high-side terminal of the load, and the high-side man electrode of the second reversible buck-boost chopper circuit is connected to the low-side terminal of the load. The inverter circuit comprises a control circuit connected to the control terminal of each of the first to fourth switching elements of each of the first and second reversible buck-boost chopper circuits. The control circuit is configured to turn on and off at least one of the first to fourth switching elements of the first reversible buck-boost chopper circuit to produce a first output voltage. The control circuit is configured to turn on and off at least one of the first to fourth switching elements of the second reversible buck-boost chopper circuit to produce a second output voltage. The first output voltage is applied to the high-side terminal of the load, and the second output voltage is applied to the low-side terminal of the load. As a result, the load is driven by the differential voltage between the first and the second output voltages.

According to a further aspect of the present invention, there is provided an inverter circuit connected between a DC power source and a polyphase motor with polyphase windings. The inverter circuit comprises a plurality of reversible buck-boost chopper circuits. Each of the plurality of reversible buck-boost chopper circuits comprises a first half-bridge circuit with a first output terminal. The first half-bridge circuit includes a first switching element having a high-side main electrode connected to a positive electrode of the DC power source. The first half-bridge circuit comprises a second switching element connected to the first switching element in series at the first output terminal. The second switching element has a low-side main electrode connected to a negative electrode of the DC power source. Each of the plurality of reversible buck-boost chopper circuits comprises a second half-bridge circuit with a second output terminal. The second half-bridge circuit includes a third switching element having a high-side main electrode. The second half-bridge circuit includes a fourth switching element connected through the second output terminal to the third switching element in series. The fourth switching element has a low-side main electrode connected to the negative electrode of the DC power source. Each of the plurality of reversible buck-boost chopper circuits comprises a reactor connected between the first output terminal of the first half-bridge circuit and the second output terminal of the second half-bridge circuit. The number of the reversible buck-boost chopper circuits is a positive integer multiple of a number of phase of the polyphase motor. Each of the high-side main electrodes of the third switching elements of the plurality of the reversible buck-boost chopper circuits is connected to an end of at least one of the polyphase windings of the polyphase motor.

According to a still further aspect of the present invention, there is provided an inverter circuit connected between a DC power source and a load. The inverter circuit comprises a reversible buck-boost chopper circuit. The reversible buck-boost chopper circuit comprises a first half-bridge circuit with a first output terminal. The first half-bridge circuit includes a first switching element having a high-side main electrode connected to a positive electrode of the DC power source. The first half-bridge circuit includes a second switching element connected to the first switching element in series at the first output terminal. The second switching element has a low-side main electrode connected to a negative electrode of the DC power source. The reversible buck-boost chopper circuit comprises a second half-bridge circuit with a second output terminal. The second half-bridge circuit includes a third switching element having a high-side main electrode connected to a high-side terminal of the load. The second half-bridge circuit includes a fourth switching element connected to the third switching element in series at the second output terminal. The fourth switching element has a low-side main electrode connected to a low-side terminal of the load and the negative electrode of the DC power source. The reversible buck-boost chopper circuit comprises a reactor connected between the first output terminal of the first half-bridge circuit and the second output terminal of the second half-bridge circuit. The inverter circuit comprises a control circuit connected to the control terminal of each of the first to fourth switching elements of the reversible buck-boost chopper circuit. The control circuit is configured to turn on and off at least one of the first to fourth switching elements of the reversible buck-boost chopper circuit so as to cause the reversible buck-boost chopper circuit to serve as a DC to DC converter. The reversible buck-boost chopper circuit produces a predetermined DC voltage, thereby applying the produced DC voltage to the load.

BRIEF DESCRIPTION OF THE DRAWINGS

Other objects and aspects of the invention will become apparent from the following description of embodiments with reference to the accompanying drawings in which:

FIG. 2B is a time chart of turning the switching elements on and off in the buck-and-forward power transmission mode;

FIG. 3B is a time chart of turning the switching elements on and off in the boost-and-reverse power transmission mode;

FIG. 4B is a time chart of turning the switching elements on and off in the buck-and-reverse power transmission mode;

DETAILED DESCRIPTION OF EMBODIMENTS OF THE INVENTION

Embodiments of the present invention will be described hereinafter with reference to the accompanying drawings. In each embodiment, a motor driver employs an inverter circuit with a buck/boost chopper circuit according to one of the aspects of the present invention.

First Embodiment

An inverter circuit for motor drivers according to a first embodiment of the present invention will be described hereinafter with reference to the accompanying drawings.

Structure of the inverter circuit including the chopper circuit.

Figure 1A:
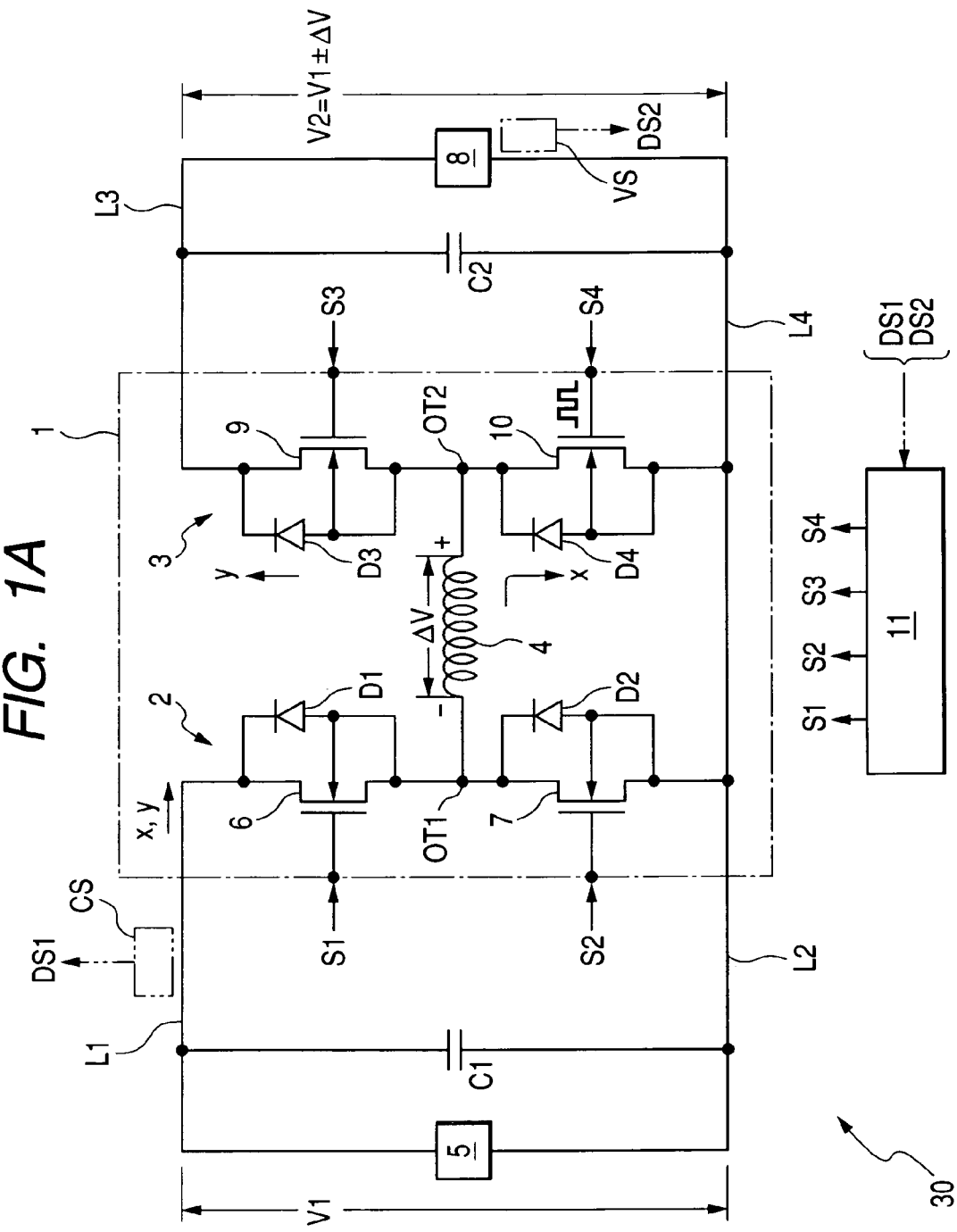
FIG. 1A is a circuit diagram illustrating an inverter circuit including a buck-boost chopper circuit in a boost-and-forward power transmission mode according to a first embodiment of the present invention.

As illustrated in FIG. 1A, the inverter circuit 30 is provided with a chopper circuit 1 and a first smoothing capacitor C1, which is an example of a first voltage smoothing circuit according to the invention. The first smoothing capacitor C1 is located at one of input-output ends of the chopper circuit 1. The inverter circuit 30 is provided with a second smoothing capacitor C2, which is an example of a second voltage smoothing circuit according to the invention, located at the other of the input-output ends of the chopper circuit 1.

The chopper circuit 1 is provided with a supply-side half-bridge circuit 2, a load-side half bridge circuit 3, and a reactor 4, such as a choke coil.

The supply-side half-bridge circuit 2 includes an upper-arm switching element (high-side switching element) 6 whose high-side main electrode is connected to the positive electrode of a DC power source 5 through a line L1. The supply-side half-bridge circuit 2 includes a lower-arm switching element (low-side switching element) 7 connected to the upper-arm switching element 6 in series at a first output terminal OT1 of the circuit 2.

Specifically, the low-side main electrode of the upper-arm switching element 6 is connected to the high-side main electrode of the lower-arm switching element 7 at the first output terminal OT1 of the circuit 2. The low-side main electrode of the lower-arm switching element 7 is connected to the negative electrode of the DC power source 5 through a line L2. The first smoothing capacitor C1 is connected the between the lines L1 and L2 to be parallel to the supply-side half-bridge circuit 2 (the upper-arm and lower-arm switching elements 6 and 7) and the DC power source 5.

The upper-arm switching element 6 and the lower-arm switching element 7 are referred to as "first switching element and second switching element" respectively.

The load-side half-bridge circuit 3 includes an upper-arm switching element (high-side switching element) 9 whose high-side main electrode is connected to the high-side terminal of a load 8 through a line L3. The load-side half-bridge circuit 3 includes a lower-arm switching element (low-side switching element) 10 connected to the upper-arm switching element 9 in series at a second output terminal OT2 of the circuit 3.

Specifically, the low-side main electrode of the upper-arm switching element 9 is connected to the high-side main electrode of the lower-arm switching element 10 at the second output terminal OT2. The low-side main electrode of the lower-arm switching element 10 is connected to the low-side terminal of the load 6 through a line L4 and to the negative electrode of the DC power source 5 through the line L2. The second smoothing capacitor C2 is connected between the lines L3 and L4 to be parallel to the load-side half-bridge circuit 3 (the upper-arm and lower-arm switching elements 9 and 10) and the load 8. The upper-arm switching element 9 and the lower-arm switching element 10 are referred to as "third switching element and fourth switching element" respectively.

Figure 1B:
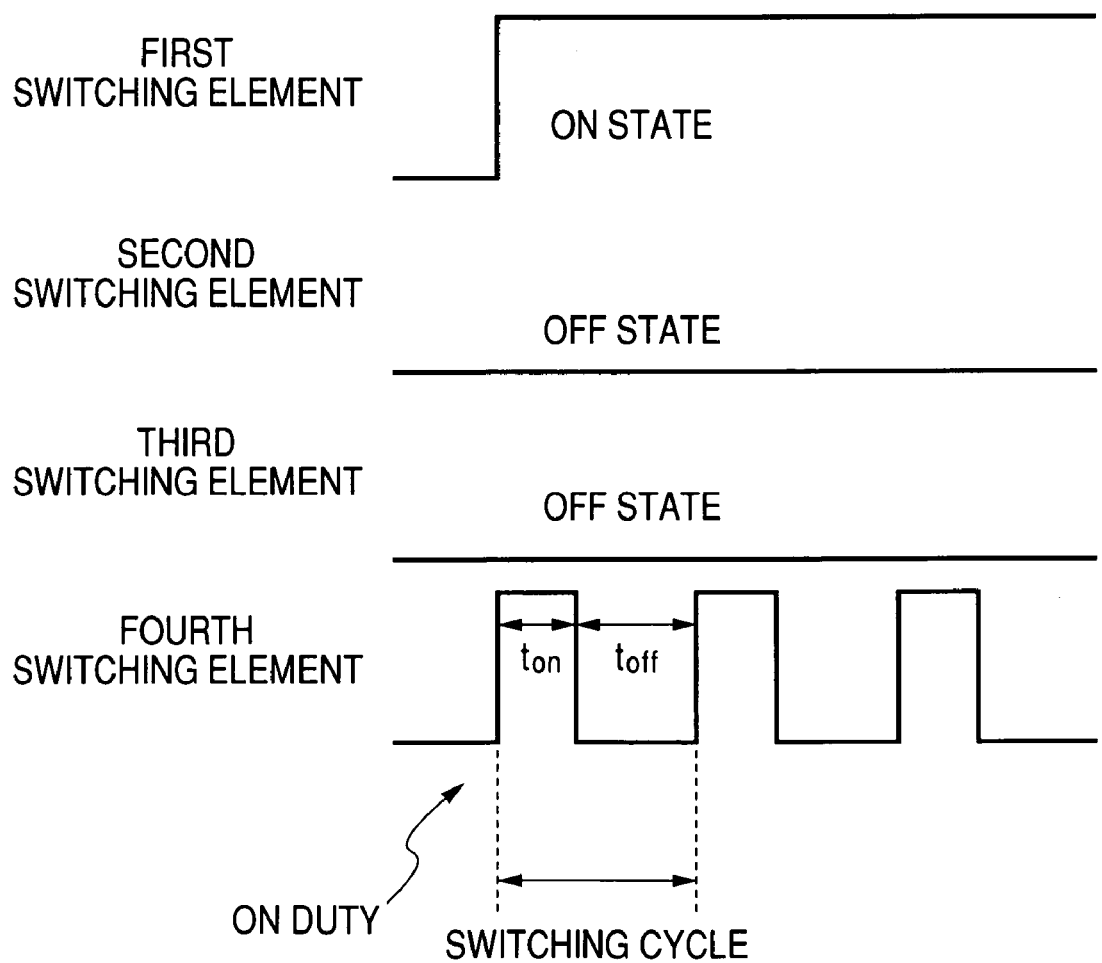
FIG. 1B is a time chart of turning the switching elements on and off in a boost-and-forward power transmission mode.

For example, each of the first to fourth switching elements 6, 7, 9, and 10, as shown in FIG. 1, is composed of an NMOS (N-channel Metal Oxide Semiconductor) power transistor with high breakdown voltage. Incidentally, reference characters D1 to D4 represent intrinsic diodes of the first to fourth switching elements 6, 7, 9, and 10, respectively. A semiconductor element with substantially the same function as the NMOS power transistor, such as a combination of IGBT (Insulated Gate Bipolar Transistor) and a flywheel diode, can replace each of the NMOS power transistors.

The inverter circuit 30 is provided with a control circuit 11 electrically connected to each of the control (gate) terminals of the first to fourth switching elements 6, 7, 9, and 10 (see S1 to S4 in FIG. 1) so that the control circuit 11 allows turning on and off of each of the switching elements 6, 7, 9, and 10.

In the first embodiment, the control circuit 11 is composed of, for example, a computer circuit having at least an analog to digital converter, a digital to analog converter, a CPU and a memory. The control circuit 11 is programmed to execute the turning on and off operations of the first to fourth switching elements 6, 7, 9, and 10 individually. Incidentally, for the control circuit 11, an analog circuit having at least a PWM circuit and a gate driving circuit can be used for executing the turning on and off operations of the first to fourth switching elements 6, 7, 9, and 10 individually.

The reactor 4 is connected between the first output terminal OT1 of the supply-side half-bridge circuit 2 and the second output terminal OT2 of the load-side half-bridge circuit 3.

The inverter circuit 30 has preferably a pair of current sensors connected to the control circuit 11. One of the current sensors is configured to sense an output current flowing out of the chopper circuit 1 toward the DC power source 5 to feed a current sib back to the control circuit 11. The other of the current sensors is configured to sense an output current flowing out of the chopper circuit 1 toward the load 8 to feed a current signal bark to the control circuit 11.

In the first embodiment, a current sensor CS (see FIG. 1) is provided for sensing the output current from the chopper circuit 1 toward the DC power source 5 to feed a current signal DS1 back to the control circuit 11.

In the fat embodiment, the control circuit 11 is operative to individually control the duties (duty ratios) of control signals (PWM signals) based on the detection signal DS1 corresponding to the feedback current to control the first to fourth switching elements 6, 7, 9, and 10. Any deviation between a target output current and the actual output current from the chopper circuit 11 can be minimized by this duty control.

In addition, the inverter circuit 30 can be provided with a pair of voltage sensors connected to the control circuit 11. One of the voltage sensors is configured to sense an output voltage applied to the load 8 to feed a voltage signal back to the control circuit 11. The other of the voltage sensors is configured to sense an output voltage applied to the DC power source 5 to feed a voltage signal back to the control circuit 11.

In the first embodiment, a voltage sensor VS is provided for sensing the output voltage applied to the load 8 to feed a voltage signal DS2 back to the control circuit 11.

In the first embodiment, the control circuit 11 is operative to individually control switching of the first to fourth switching elements 6, 7, 9, and 10 based on the voltage signal DS2, thereby minimizing deviation between a target voltage and the output voltage from the chopper circuit 11.

The load 8 of the chopper circuit 1 shown in FIG. 1 is, for example, a resistive load with a constant resistance, so that a voltage drop across the resistive load is proportional to the output current flowing into the load 8. This allows the current-feedback control and the voltage-feedback control set forth above to be substantially identical with each other, so that the inverter circuit 30 can adopt at least one of the current-feedback control and the voltage-feedback control.

In the first embodiment, the target voltage is set to, for example, a sinusoidal waveform whose maximum instantaneous voltage is nearly twice as high as the DC voltage across the DC power source 5. The control circuit 11 has a memory with data representing the waveform of the sinusoidal voltage (target voltage) stored therein.

The target voltage according to the first embodiment can also be set to a DC voltage variable for many purposes. Using the DC voltage as the target voltage allows the circuit 30 shown in FIG. 1 to serve as a chopper type DC to DC converter. The chopper type DC to DC converter has reversible power-transmission capability and allows a voltage across the load 8, in some cases a generator, to step up or down with respect to the DC voltage of the DC power source 5. Each of the first and second smoothing capacitors C1 and C2 has a function of decreasing high-frequency noises generated due to switching operations of the first to fourth switching elements 6, 7, 9, and 10. This noise decreasing function itself has been well known, so that the descriptions of which are omitted.

Next, operations of the chopper circuit 1 will be described hereinafter. Incidentally, in the first embodiment, power transmission from the DC power source 5 to the load 8 is referred to as "forward power transmission", and power transmission from the load 8 to the DC power source 5 is referred to as "reverse power transmission" hereinafter.

Boost-and-Forward Power Transmission Mode

Operations of the inverter circuit 30 in a boost-and-forward power transmission mode will be described hereinafter, while the output voltage across the load 8, which is detected by the control circuit 11 based on the detected signal DS2, is higher than the DC voltage of the DC power source 5; Incidentally, the output voltage across the load 8 is referred to as "V2", and the DC voltage across the DC power source 5 is referred to as "V1" (see FIG. 1A).

Flow of a current in the chopper circuit 30 in the boost-and-forward power transmission mode is represented as by arrows x and y in FIG. 1A.

While keeping the first switching element 6 on, the control circuit 11 executes the following operations.

Specifically, the control circuit 11 turns the fourth switching element 10 on for a predetermined ON-duty in every predetermined switching cycle, while keeping the first switching element 6 on throughout the switching cycle. Incidentally, the second and third switching elements 7 and 9 are kept off throughout the switching cycle by the control circuit 11. The ON-duty of the fourth switching element 10 represents the ratio of its on time to its switching cycle (see FIG. 1B). In other words, the predetermined switching cycle is a reciprocal of the switching frequency of the fourth switching element 10.

During the ON-period of the fourth switching element 10 in each predetermined switching cycle, an input current x from the DC power source 5 flows through the first switching element 6, the reactor 4, and the fourth switching element 10 in this order. This current x energizes the reactor 4 so that the reactor 4 stores magnetic energy therein. The ON-period of the fourth switching element 10 is referred to as "energizing perod".

During an OFF-period of the fourth switching element 10 in each predetermined switching cycle, an output current y from the DC power source 5 flows through the first switching element 6, the reactor 4, the intrinsic diode D3 of the third switching element 9, and the load 8 in this order. The OFF-period of the fourth switching element 10 is referred to as "de-energizing period".

Because the resistance throughout the path in which the current y flows is higher than that for the current x due to the additional resistance of the load 8, the current y decreases along time while the current x increases. This decrease of the current y causes the reactor 4 to discharge the stored magnetic energy in the direction that cancels the change of the current y. Specifically, the polarity of a voltage ΔV generated by the discharged magnetic energy from the reactor 4 is directed to increase the DC voltage V1; this polarity is shown as "+" and "−" in FIG. 1A.

That is, the voltage ΔV generated by the reactor 4 is applied to the load 8 in addition to the DC voltage V1 so that the load 8 is subjected to the output voltage V2 which is;

$V2=V1+\Delta V$

Specifically, repetition of turning on and off of the fourth switching element 10 according to a predetermined ON-duty in every predetermined switching cycle while the first switching element 6 kept on permits the input DC voltage V1 to be boosted to the output voltage V2. The boosted output voltage V2 drives the load 8 at a higher power. In some cases, the load 8 may have a fixed self-voltage or an open-circuit voltage, such as a battery voltage; in this case, the output current y from the chopper circuit 1 is self-adjusted depending on the self-voltage of the load 8.

The reactor voltage ΔV depends on the amount of magnetic energy stored in the reactor 4. To produce the boosted output voltage V2 aligned with a desired waveform set within predetermined voltage and current ranges, the ON-duty of the fourth switching element 10 is adjusted in accordance with the desired voltage waveform. For example, changing the ON-duty of the fourth switching element 19 based on the waveform of a sinusoidal voltage (target voltage) stored in the memory of the control circuit 11 produces the boosted output voltage V2 with a waveform corresponding to the target voltage waveform. In order to reduce the loss of the third switching element 9 due to, for example, its conduction resistance of the intrinsic diode D3, the control circuit 11 can execute synchronous rectifying operations turning the third switching element 9 on during every OFF-period of the fourth switching element 10.

Buck-and-Forward Power Transmission Mode

Figure 2A:
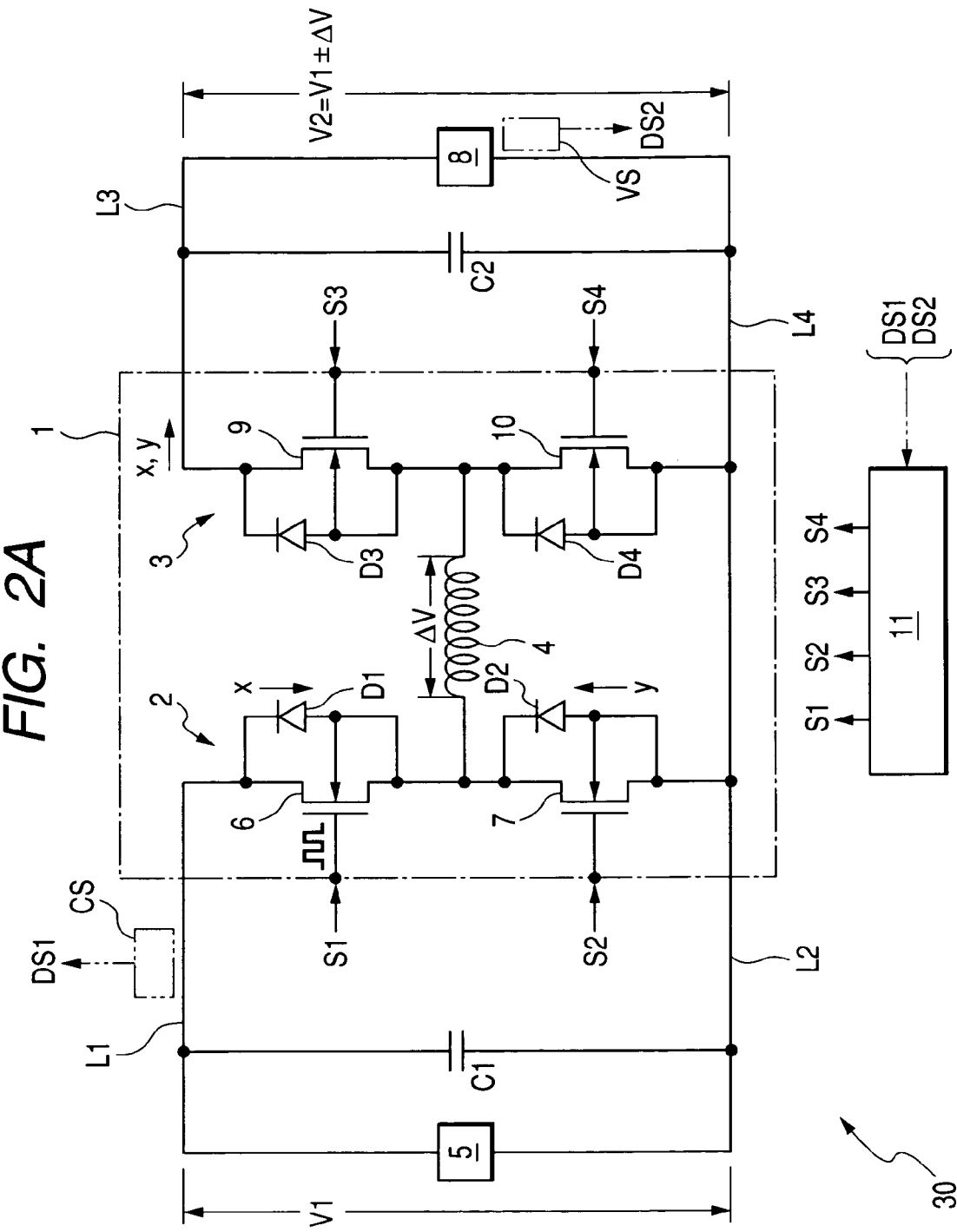
FIG. 2A is a circuit diagram illustrating the inverter circuit including the buck-boost chopper circuit in a buck-and-forward power transmission mode according to the first embodiment of the present invention.

Operations of the inverter circuit 30 in a buck-and-forward power transmission mode will be described hereinafter, while the AC voltage V2 across the load 8 is lower than the DC voltage V1 of the DC power source 5. Flow of a current in the chopper circuit 30 in the buck-and-forward power transmission mode is represented by arrows x and y in FIG. 2A.

While keeping the third switching element 9 on, the control circuit 11 executes the following operations.

Specifically) the control circuit 11 turns the first switching element 6 on for a predetermined ON-duty in every predetermined switching cycle, while keeping the third switching element 9 on throughout the switching cycle. Incidentally, the second and fourth switching elements 7 and 10 are kept off the control circuit 11. The ON-duty of the first switching element 6 represents the ratio of its on time to its switching cycle (see FIG. 2B). For example, the predetermined switching cycle is a reciprocal of the switching frequency of the first switching element 6.

During the ON-period of the first switching element 6 in each predetermined switching cycle, an input current x from the DC power source 5 flows through the first switching element 6, the reactor 4, and the third switching element 9 in this order. This input current x energizes the reactor 4 so that the reactor 4 stores magnetic energy therein. The input current x flowing through the reactor 4 generates a reactor voltage ΔV across the reactor 4 so that the output voltage V2 applied to the load 8, which is;

$$V2 = V1 - \Delta V$$

where V1 is a DC voltage of the DC power source 5.

During the OFF-period of the first switching element 6 in each predetermined switching cycle, the reactor 4 discharges the stored magnetic energy as electric power so that a flywheel current y circulates through the reactor 4, the third switching element 9, the load 8, and the intrinsic diode D2 of the second switching element 7. The flywheel current y causes the reactor voltage ΔV to be applied to the load 8 as the output voltage V2 (ΔV=V2). The output voltage V2 decreases with de-energizing of the reactor 4. The OFF-period of the first switching element 6 is referred to as "de-energizing period".

As described above, repetition of turning on and off of the first switching element 6 according to a predetermined ON-duty in every predetermined switching cycle while the third switching element 9 is kept on permits the input DC voltage V1 to be stepped down to the output voltage V2. The reduced output voltage V2 from the DC input voltage V1 drives the load 8. In some cases, the load 8 may have a self-voltage or an open-circuit voltage, such as a battery voltage; in this case, the output current y from the chopper circuit 1 is self-adjusted depending on the self-voltage of the load 8.

The reactor voltage ΔV depends on the amount of magnetic energy stored therein. To produce the stepped-down output voltage V2 aligned with a desired waveform set within predetermined voltage and current ranges, the ON-duty of the first switching element 6 is adjusted in accordance with the desired voltage waveform. For example, changing the ON-duty of the first switching element 6 based on the waveform of a sinusoidal voltage (target voltage) stored in the memory of the control circuit 11 produces the stepped down output voltage V2 with a waveform corresponding to the target voltage waveform. In order to reduce the loss of the second switching element 7 due to, for example, its conduction resistance of the intrinsic diode D2, the control circuit 11 can execute synchronous rectifying operations turning the second switching element 7 on during every OFF-period of the first switching element 6.

The boost-and-forward power transmission mode and the buck-and-forward power transmission mode set forth above constitute a forward power transmission mode wherein power is transmitted from the DC power source 5 to the load 8.

Specifically, in order to apply a fully swung sinusoidal voltage to the load 8, the control circuit 11 needs to go between the boost-and-forward mode and the buck-and-forward mode. For the upper half of the sinusoidal waveform where output voltage V2 is higher than the DC supply voltage V1, the control circuit 11 operates in the boost-and-forward power transmission mode in which the fourth switching element 10 is turned on and off, while for the lower half of the sinusoidal waveform where output voltage V2 is lower than the DC supply voltage, the control circuit operates in the buck-and-forward power transmission mode in which the first switching element 6 is turned on and off.

In the following sections, operations of the chopper circuit 1 in a reverse power transmission modes will be described in which power is transmitted from the load 8 to the DC power Source 5. The reverse power transmission mode is used when the load 8 has power generation capability. In the first embodiment, the load 8 is a stator coil of a traction motor.

Boost-and-Reverse Power Transmission Mode

Figure 3A:
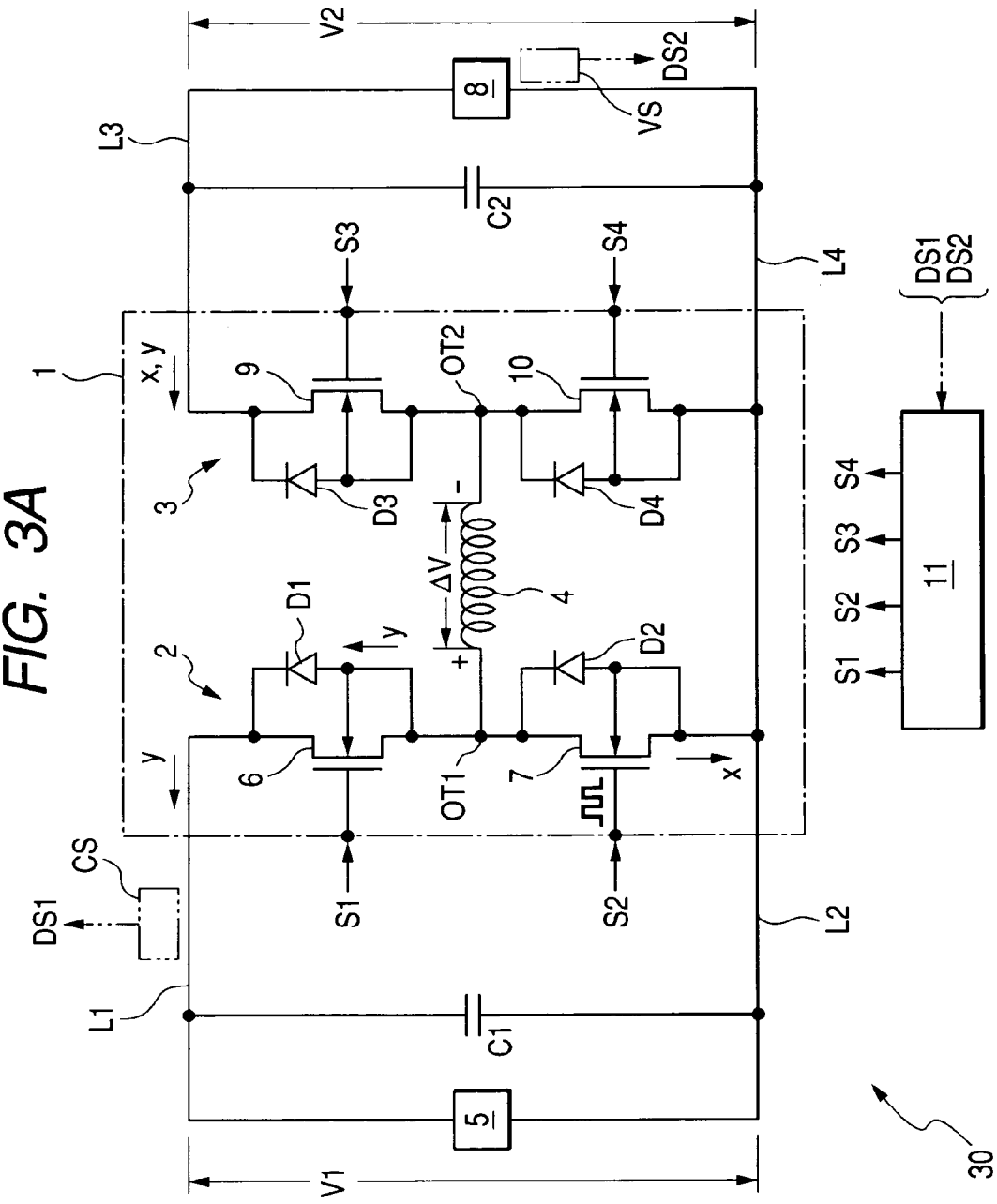
FIG. 3A is the circuit diagram illustrating the inverter circuit including the buck-boost chopper circuit in a boost-and-reverse power transmission mode according to the first embodiment of the present invention.

Operations of the inverter circuit 30 in a boost-and-reverse power transmission mode will be described hereinafter, while the output voltage V2 across the load 8 is lower than the DC voltage V1 of the DC power source 5. Flow of a current in the chopper circuit 30 in the boost-and-reverse power transmission mode is represented by arrows x and y in FIG. 3A.

While keeping the third switching element 9 on, the control circuit 11 executes the following operations.

Specifically, the control circuit 11 turns the second switching element 7 on for a predetermined ON-duty in every predetermined switching cycle, while keeping the third switching element 9 on throughout the switching cycle. Incidentally, the first and fourth switching elements 6 and 10 are kept off throughout the switching cycle by the control circuit 11 (see FIG. 3B).

During the ON-period of the second switching element 7 in each predetermined switching cycle, an input current x from the load 8 flows through the third switching element 9, the reactor 4, and the second switching element 7 in this order. This output current x energizes the reactor 4 so that the reactor 4 stores magnetic energy therein. The ON-period of the second switching element 7 is referred to as "energizing period".

During an OFF-period of the second switching element 7 in each predetermined switching cycle, a current y regenerated from the load 8 flows through the third switching element 9, the reactor 4, the intrinsic diode D1 of the first switching element 6, and the DC power source 5 in this order. The OFF-period of the second switching element 7 is referred to as "de-energizing period".

Because the resistance throughout the path in which the current y flows is higher than that for the current x due to the additional resistance of the DC power source 5, the current y decreases along time while the current x increases. This decrease of the current y causes the reactor 4 to discharge the stored magnetic energy in the direction that cancels the change of the current y. Specifically, the polarity of a voltage ΔV generated by the discharged magnetic energy from the reactor 4 is directed to increase the AC voltage V2; this polarity is shown as "+" and "−" in FIG. 3A.

That is, the voltage ΔV generated by the reactor 4 is applied to the DC power source 5 in addition to the AC voltage V2 so that the DC voltage V1 of the power source 5 is boosted.

As described above, repetition of turning on and off of the second switching element 7 according to a predetermined ON-duty in every predetermined switching cycle while the third switching element 9 kept on permits the DC voltage V1 to be boosted.

When the DC power source 5 is a battery capable of supplying a substantially constant voltage, the chopper circuit 1 serves as a rectifying circuit. An important point in the boost-and-reverse power transmission mode of the first embodiment is that controlling the ON-duty of the second switching element 7 allows power regenerated in the load 8 to be regulated.

Specifically, the control circuit 11 detects the output current y flowing toward the DC power source 5 based on the detection signal DS1. The control circuit 11 executes feedback control of the duty of the second switching element 7 based on the feedback current y so as to minimize the difference between the target current and the feedback current y. The feedback control allows constant power regeneration in the load 8 based on the target current.

That is, in the first embodiment, even if the level of the AC voltage V2 regenerated in the load 5 is lower than the DC voltage V1, it is possible to provide regenerative electric power to the DC power source 5 so that the load 8, such as a traction motor operating under regenerative braking mode, can effectively regenerate AC current at a constant power. Unlike conventional regenerative braking control, this prevents the regenerated current from rapidly increasing even when the regenerated voltage V2 exceeds the voltage V1 of the DC power source 5.

Buck-and-Reverse Power Transmission Mode

Figure 4A:
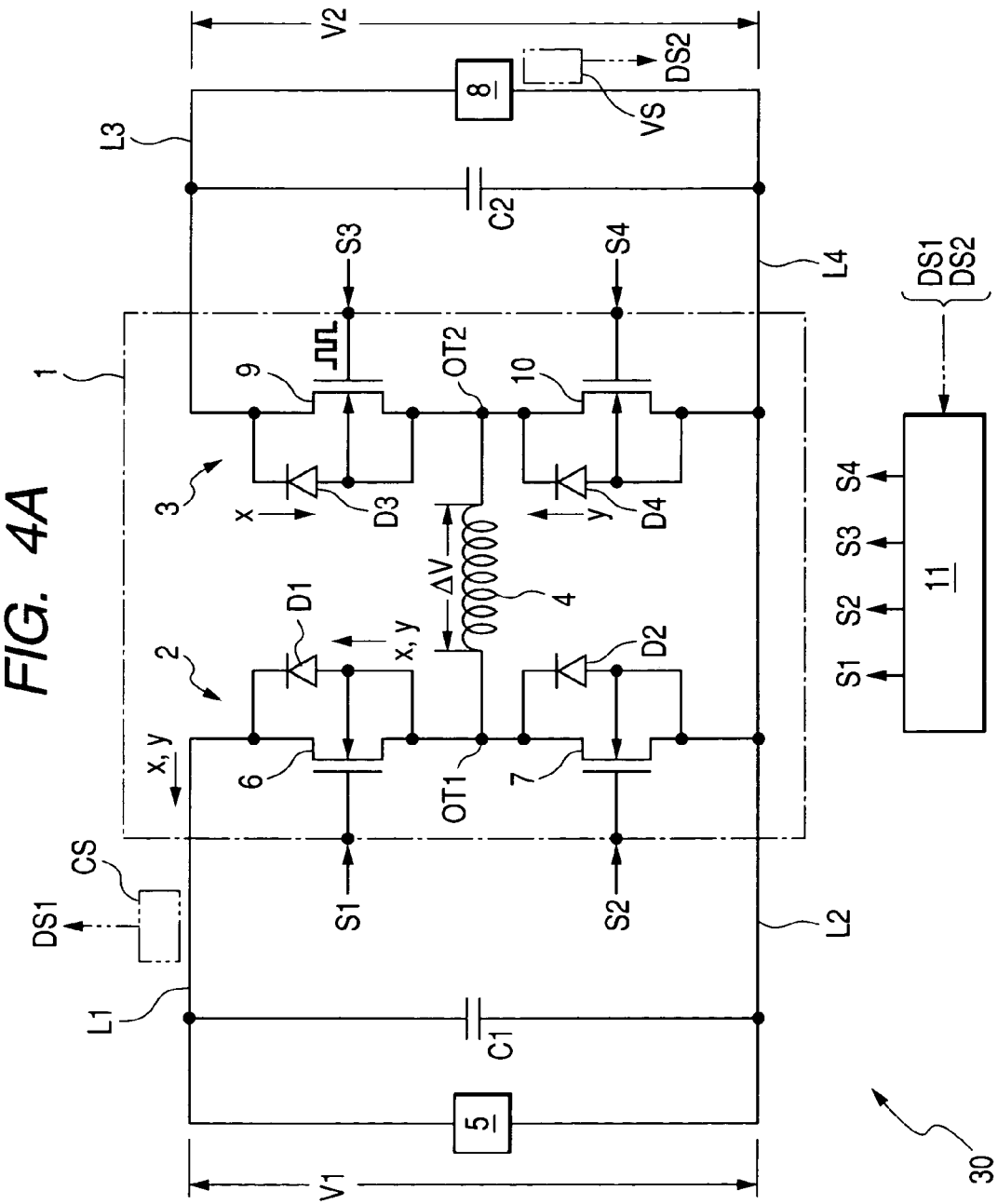
FIG. 4A is the circuit diagram illustrating the inverter circuit including the buck-boost chopper circuit in a buck-and-reverse power transmission mode according to the first embodiment of the present invention.

Operations of the inverter circuit 30 in a buck-and-reverse power transmission mode will be described hereinafter, while the output voltage V2 regenerated from the load 8 is higher than the DC voltage V1 of the DC power source 5. Flow of a current in the chopper circuit 30 in the buck-and-reverse power transmission mode is represented by arrows x and y in FIG. 4A.

While keeping the third switching element 9 on, the control circuit 11 executes the following operations.

Specifically, the control circuit 11 turns the third switching element 9 on for a predetermined ON-duty in every predetermined switching cycle, while keeping the first switching element 6 on throughout the switching cycle. Incidentally, the second and fourth switching elements 7 and 10 are kept off throughout the switching cycle by the control circuit 11 (see FIG. 4B).

During the ON-period of the third switching element 9 in each predetermined switching cycle, an input current x from the load 8 flows through the third switching element 9, the reactor 4, and the first switching element 6 in this order. This input current x energizes the reactor 4 so that the reactor 4 stores magnetic energy therein. The input current x flowing through the reactor 4 generates a reactor voltage ΔV across the reactor 4 so that the voltage V1 applied to the DC power source 5, which is;

$$V1 = V2 - \Delta V$$

where V2 is an AC voltage of the load 8.

During the OFF-period of the third switching element 9 in each predetermined switching cycle, the reactor 4 discharges the stored magnetic energy as electric power so that a flywheel current y circulates through the reactor 4, the first switching element 6, the DC power source 5, and the intrinsic diode D4 of the fourth switching element 10. The flywheel current y causes the reactor voltage ΔV to be applied to the DC supply 5 as an output voltage ΔV. The output voltage ΔV decreases with de-energizing of the reactor 4. The OFF-period of the third switching element 9 is referred to as "de-energizing period".

As described above, repetition of turning-on and off of the third switching element 9 according to a predetermined ON-duty in every predetermined switching cycle while the first switching element 6 is kept on permits the load 8 to regenerate power based on the AC voltage V2 that is higher than the voltage applied to the DC power source 5. In the buck-and-reverse power transmission mode, it is possible for the control circuit 11 to execute feedback control of the duty of the third switching element 9 based on the detected current y so as to minimize the difference between the target current and the detected current y. The feedback control allows constant power regeneration in the load 8 based on the target current.

In the buck-and-reverse power transmission mode, in order to reduce the loss of the fourth switching element 10 due to, for example, its conduction resistance of the intrinsic diode D4, the control circuit 11 can execute synchronous rectifying operations turning the fourth switching element 10 on during every OFF-period of the third switching element 9.

The boost-and-reverse power transmission mode and the buck-and-reverse power transmission mode set forth above constitute the reverse power transmission mode wherein power is reversely transmitted from the load 8 to DC power source 5.

As described above, in the first embodiment, as shown in FIG. 1, the chopper circuit 1 is con ed to form a pseudo bridge circuit that allows easily alternately energizing and de-energizing the reactor 4. This configuration permits the forward power transmission and the reverse power transmission with high transmission efficiency in any relationship between the DC voltage across the DC power source 5 and the voltage across the load 8.

Specifically, the chopper circuit 1 according to the first embodiment allows control over the power regenerated in the load 8. In addition, the chopper circuit 1 permits reversibly transmitting power between the DC power source 5 and the load 8 irrespective of the voltage of the load 8 and that of the DC power source 5. Changing the waveform of the target voltage and/or current allows the chopper circuit 1 to selectively serve as an inverter or as a DC to DC converter depending on the purpose.

When the chopper circuit 11 is installed in a vehicle and the vehicle has an auxiliary battery (typically of 12V) and a main battery with high voltage (typically over 100V), the control circuit 11 controls the switching elements 6, 7, 9, and 10 to cause the chopper circuit 1 to serve as a DC to DC converter. This allows power transmission between the auxiliary battery and the main battery.

In addition, in the chopper circuit 1 according to the first embodiment, the number of switching elements through which power passes over the power transmission channel between the DC power source 5 and the load 8 can be reduced in comparison to the conventional boost DC to DC converter. This makes it possible to reduce circuit loss, thereby reducing the heat load of the chopper circuit 1.

In the first embodiment, it is easy to make the output voltage waveform of the chopper circuit 1 align to the target sinusoidal waveform with better precision than conventional PWM inverters. Connecting an electric traction motor as the load 8, the configuration of the first embodiment results in better control of the output torque and reduced acoustic and electromagnetic noise therefrom.

Incidentally, in the first embodiment, a well-known soft switching technique can be applied to the switching of each of the switching elements 6, 7, 9, and 10 to reduce switching losses. The soft switching is achieved by zero volt switching (ZVS) or zero current switching (ZCS) at each switching element, thereby reducing switching noises otherwise caused by the hard switching operations of the conventional PWM techniques.

Providing the voltage smoothing circuit, such as the voltage smoothing capacitor C2, allows the output waveform from the chopper circuit 1 to be a smooth AC waveform rather than a modulated high-frequency saw-teeth waveform. Incidentally, when using the chopper circuit 1 to be installed in a vehicle, the chopper circuit 1 can be used to produce a single-phase commercial AC voltage from any one of the DC power sources onboard. In this case, when the voltage of the DC power source is higher than the maximum instantaneous value of the single-phase commercial AC voltage to be produced, the chopper circuit 1 need only serve as a forward buck chopper circuit. This allows, therefore, some of the switching elements to be replaced with diodes.

Figure 5:
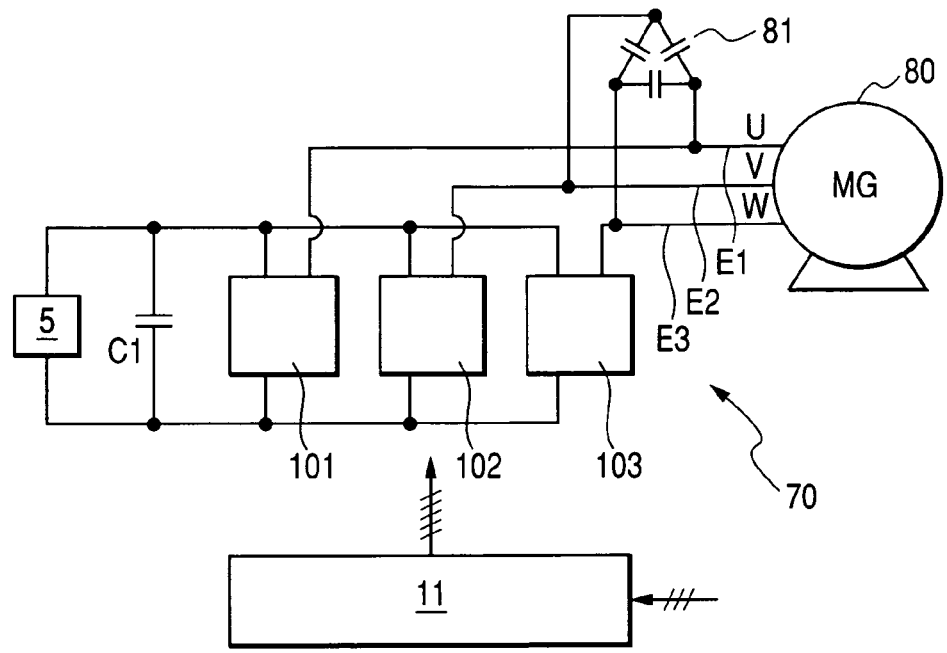
FIG. 5 is a block diagram schematically illustrating a system of a three-phase AC inverter using the chopper circuit shown in FIG. 1 according to the first embodiment of the present invention.

Next, an example of driving a polyphase AC motor/generator as the load 8, such as a three-phase AC motor/generator, will be described below, using the chopper circuit 1 shown in FIG. 1 with reference to FIG. 5. In FIG. 5, reference numeral 80 represents the three-phase AC motor/generator, typically a permanent magnet AC synchronous motor, referred to simply as a motor/generator or MG serving as the load 8 shown in FIG. 1. The term motor/generator is derived from the fact that an electric machine can act both as a motor and a generator. Reference numeral 81 represents a capacitor circuit configured to form a delta connection in which a capacitor is connected between every two of the three terminals E1, E2, and E3 of the three phase windings (U-phase winding, V-phase winding, and W-phase winding, respectively. The capacitor circuit 81 serves as smoothing capacitors.

As shown in FIG. 5, a polyphase inverter circuit, such as a three-phase inverter circuit 70, is provided. The three-phase inverter circuit 70 includes a first chopper circuit 101 that provides a U-phase voltage, a second chopper circuit 102 that provides a V-phase voltage, and a third chopper circuit 103 that provides a W-phase voltage. In the first embodiment, the number of phase of the motor/generator 80 is three, so that a positive integer multiple of the number (three) of phase of the motor/generator 80 is set to the number of chopper circuits according to the first embodiment. The three chopper circuits 101 to 103 therefore are provided.

The high-side main electrodes of the upper-arm switching elements 9 of the chopper circuits 101, 102, and 103 are respectively coupled to the ends E1, E2, and E3 of the U-, V-, and W-phase windings, respectively.

Operations of each of the chopper circuits 101 to 103 are substantially identical with those of the chopper circuit 1 so that descriptions of which are omitted here.

Specifically, in the motor control, an effective value of current of each of the chopper circuits 101 to 103 is convergent to a target current for generating torque required. The duty ratio of each switching element of each of the chopper circuits 101 to 103 is gradually changed to produce three sinusoidal waveforms so that the line-to-line voltages of the three-phase inverter circuit have a phase shift of 120° between each other and have both positive and negative polarities, causing three-phase AC currents with an effective value set by the chopper circuits 101 to 103 to flow through the motor/generator. Regenerative control of each of the chopper circuits 101 to 103 is substantially identical with that of the chopper circuit 1.

The configuration of the inverter circuit 70 allows producing an output, such as a three-phase output voltage with the maximum instantaneous value that is higher than the DC voltage of the DC power source 5. Because the inverter circuit 70 is capable of controlling a regenerated current and of generating the three-phase voltage, it is possible to adopt the inverter circuit 70 to drive the motor/generator.

Although conventional PWM inverters can produce sinusoidal current output, their output voltage has the pulse-width-modulated waveform that contains high frequency harmonics. The chopper circuit 1 according to the first embodiment easily allows the output voltage to become a smooth sinusoidal voltage waveform. This makes it possible to reduce switching noises, especially of radio frequency. Since the output voltage of a conventional PWM inverter is strictly limited by the voltage of the DC power source, field weakening control was necessary when a motor/generator is running at a high rotational speed because of a high back electromotive force. Field weakening control, however, increases reactive current resulting in a deteriorated power factor. The chopper circuit 1 according to the first embodiment is capable of producing output voltages higher than that of the DC power source, making it possible to eliminate field weakening control thus improving average power factor of the system.

The first and second smoothing capacitors C1 and C2 effectively reduce high-frequency voltage components transmitted to the DC power source 5 and the load 8, respectively. This makes it possible to eject AC voltage components suitable for driving the load 8 and to prevent high frequency serge voltages from returning to the DC power source 5.

Incidentally, any kind of circuits capable of reducing high frequency voltage components can be used in place of the smoothing capacitors C1 and C2. The smoothing capacitor C2 located in parallel to the load 8 can be omitted if the output voltage fluctuations and noises are acceptable.

Second Embodiment

Figure 6:
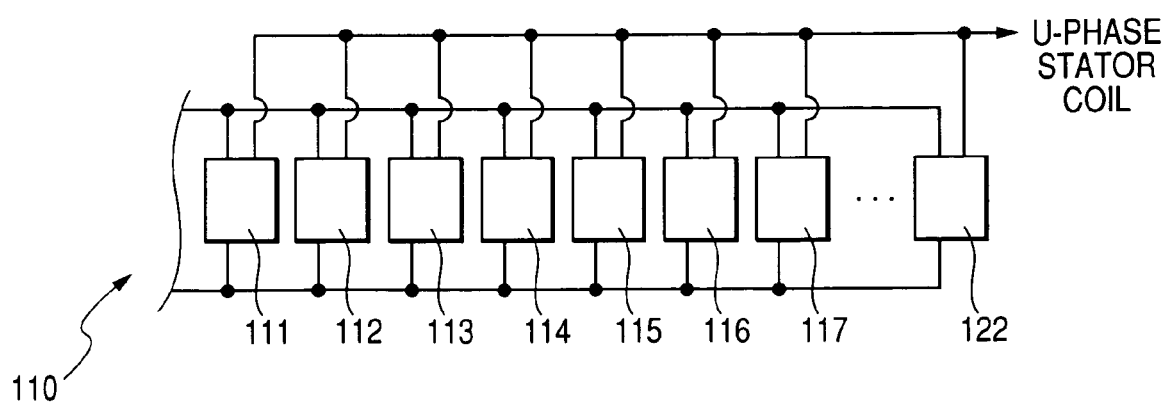
FIG. 6 is a block diagram schematically illustrating an inverter circuit according to a second embodiment of the present invention.

An inverter circuit according to a second embodiment of the present invention will be described with reference to FIG. 6. The inverter circuit uses a plurality of chopper circuits 1 shown in FIG. 1 and drives a three-phase motor/generator. Incidentally, in FIG. 6, the number of chopper circuits according to the first embodiment is set to two or more times the number (three) of phase of the three-phase motor. For example, twelve chopper circuits 111 to 122 therefore are provided for each phase.

A U-phase inverter circuit 110 is only illustrated to simply describe the inverter circuit according to the second embodiment. The U-phase inverter circuit 110 has 12 chopper circuits 111 to 112, each of which has substantially the same structure as the chopper circuit 1. The chopper circuits 111 to 122 are connected in parallel.

Each ON-timing (or OFF-timing) of each switching element of each of the chopper circuit 111 to 112, which are turned on and off for energizing and de-energizing the reactors 4, is sequentially shifted by one-twelfth the switching cycle that is the reciprocal of the switching frequency of each switching element.

In addition, the de-energizing periods of the chopper circuits 111 to 122 are shifted at regular intervals even if each de-energizing period is short.

This configuration of the chopper circuits 111 to 122 allows one of the chopper circuits 111 to 122 to store magnetic energy in the corresponding reactor 4 and another one of the chopper circuits 111 to 122 to discharge the stored magnetic energy therefrom. This permits ripple voltage components contained in the U-phase output voltage to substantially decrease.

However, when a highly boosted voltage is applied to the load 8 whose resistance is relatively small so that a large output current flows through the load 8, the reactor 4 in each of the chopper circuits 111 to 122 is immediately de-energized. This requires a long period of time for energizing the reactor 4, which may cause the ripple voltage components to increase.

In this case, the chopper circuits 111 to 122 connected in parallel can sequentially discharge the stored magnetic energies, in other words, cause currents to flow out relatively continuously. This provides the output voltage whose waveform is smooth with decreased ripple voltage components, making it possible to provide the U-phase output voltage and U-phase output current whose waveforms are substantially sinusoidal even without the voltage smoothing circuits.

The same effect applies to the V-phase and the W-phase. The smaller the output current is, the longer the period in which the magnetic energy stored in each reactor to be de-energized is. This period is referred to as de-energizing period or current output period. The de-energizing periods (current output periods) of the chopper circuits can overlap with each other. In this case, the output current of the inverter circuit is distributed among all the chopper circuits, making it possible to reduce the conduction loss and the switching loss of each chopper circuit.

The effect of decreasing output voltage fluctuations in the chopper circuits 111 to 122 connected in parallel even without the smoothing capacitor(s) allows a U-phase voltage waveform to be much closer to the target sinusoidal voltage waveform.

Each of the chopper circuits 111 to 122 is configured to apply a voltage boosted from the DC voltage to the three-phase motor when the three-phase motor operates at the rated power. This design achieves reduced copper loss and switching loss and the smooth AC output voltage waveform. The maximum output voltage value is preferably set to twice as large as the DC voltage. The output voltage of the chopper circuit contains a DC voltage offset. In polyphase motors, three-phase motors each has three phase-windings that are connected to form schematically like the Greek delta (delta connection) or to form schematically like a star (star connection), those DC voltage components applied to the input terminals of the stator coils are cancelled from each other, which has hardly impact on the stator currents.

The number of chopper circuits connected in parallel in the inverter circuit can be increased or decreased. Reducing the number of the parallel connection causes output voltage fluctuations to increase. When reducing the number of the parallel connection, it is preferable for the inverter circuit to have at least one voltage smoothing circuit, such as a smoothing capacitor described above. In this case, the 12 chopper circuits 111 to 122 make it possible to reduce the smoothing capacitor in size. A switching frequency range of each switching element in each of the chopper circuits 111 to 122 is preferably taken as high as possible if other restrictions permit, so that the reactor 4 can be designed to be unsaturated within a usable current range.

As a modification of the chopper circuit, a power supply circuit that selectively serves as an inverter and/or as a DC to DC converter depending on the status of use thereof.

In this modification, when the power supply circuit serves as the inverter, the output voltage of the inverter contains a DC voltage component offset.

Figure 7:
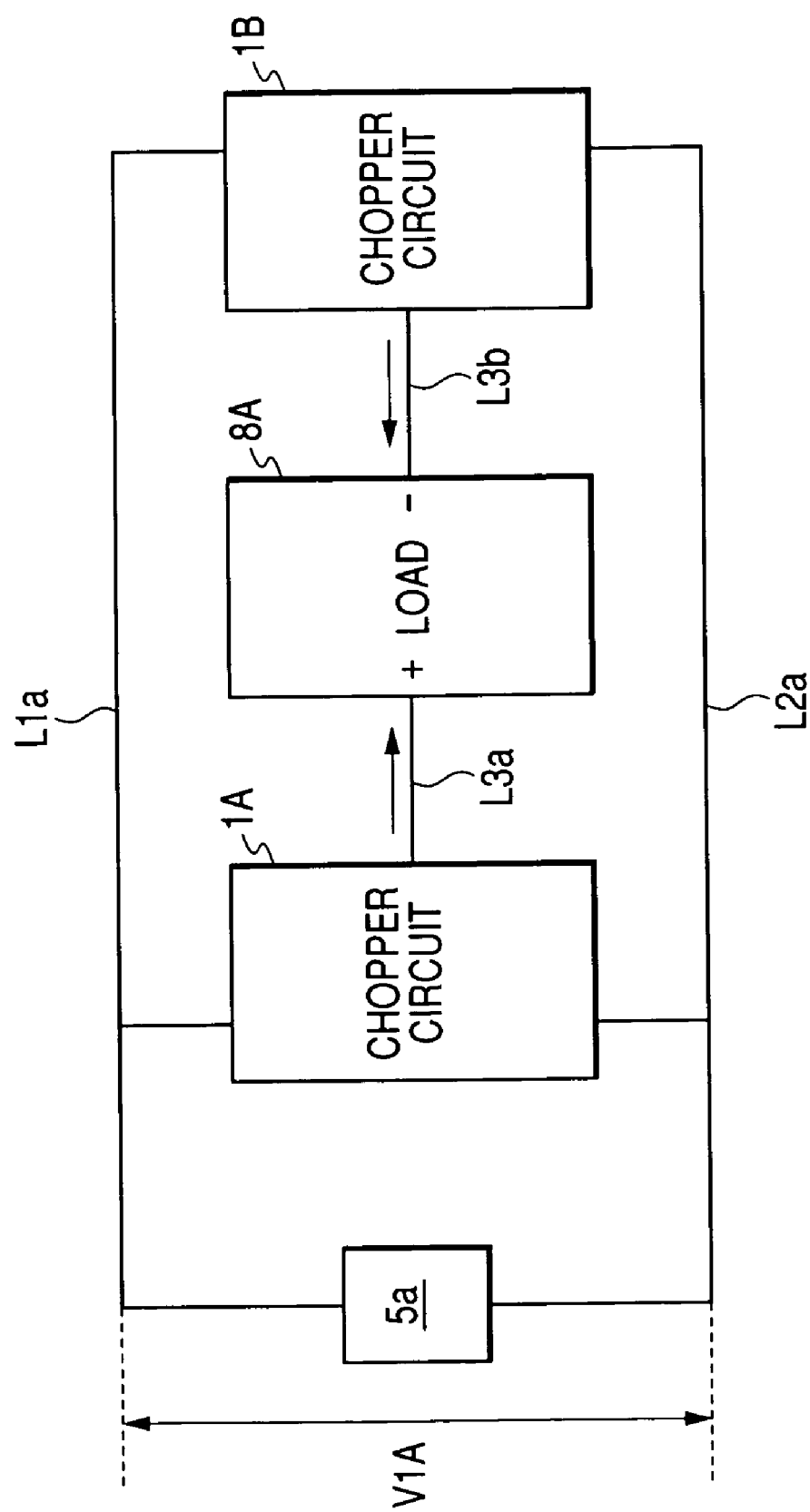
FIG. 7 is a block diagram schematically illustrating a modification of an inverter circuit according to the first and second embodiments of the present invention.

In order to remove the DC offset from the output voltage of the inverter, as shown in FIG. 7, in the modification, a plurality of chopper circuits, such as a first chopper circuit 1A and a second chopper circuit 1B, each having the same structure as the chopper 1 are provided. The high-side main electrode of the high-side switching element 9 of the first chopper circuit 1A is connected to the high-side terminal of a load 8A through a line L3a. The low-side main electrode of the low-side switching element 10 of the first chopper circuit 1A is connected to the low-side terminal of the load 8A. In contrast, the high-side main electrode of the high-side switching element 9 of the second chopper circuit 1B is connected to the low-side terminal of the load 8A through a line L3a. The low-side main electrode of the low-side switching element 10 of the second chopper circuit 1B is connected to the high-side terminal of the load 8A. Specifically, the output voltage of the first chopper circuit 1A and that of the second chopper circuit 1B are complimentarily applied to the load 8A in polarity.

Figure 8A:
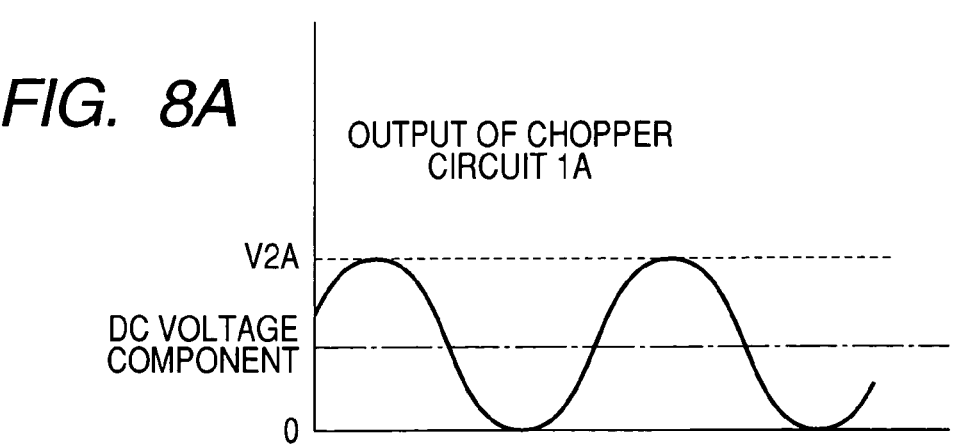
FIG. 8A is a graph schematically illustrating a waveform of an output of a first chopper circuit shown in FIG. 7.
Figure 8B:
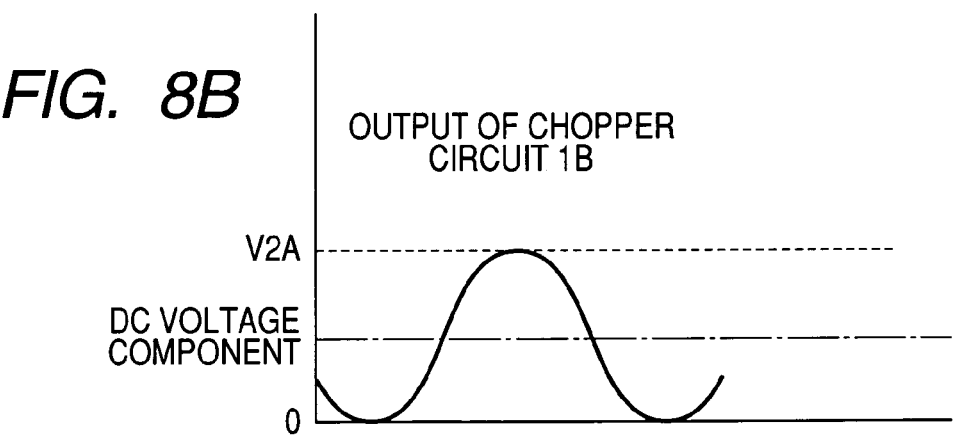
FIG. 8B is a graph schematically illustrating a waveform of an output of a second chopper circuit shown in FIG. 7.

As shown in FIG. 8A, in the modification, the control circuit 11 of the first chopper circuit 1A controls switching of the switching elements 6, 7, 9, and 10 thereof so that the sinusoidal voltage containing a predetermined DC voltage is applied to the load 8A as the output voltage of the first chopper 1A. In addition, as shown in FIG. 8B, in the modification, the control circuit 11 of the second chopper circuit 113 controls switching of the switching elements 6, 7, 9, and 10 thereof so that the sinusoidal voltage containing a predetermined DC voltage offset is applied to the load 8A as the output voltage of the second chopper 1B. The output voltage (sinusoidal voltage) of the second chopper circuit 1B has, for example, a 180° phase shift with respect to that of the first chopper circuit 1A. The voltage magnitudes of the first and second chopper circuits 1A and 1B are variable depending on the switching controls of the control circuits 11 of the first and second chopper circuits 1A and 1B.

Figure 8C:
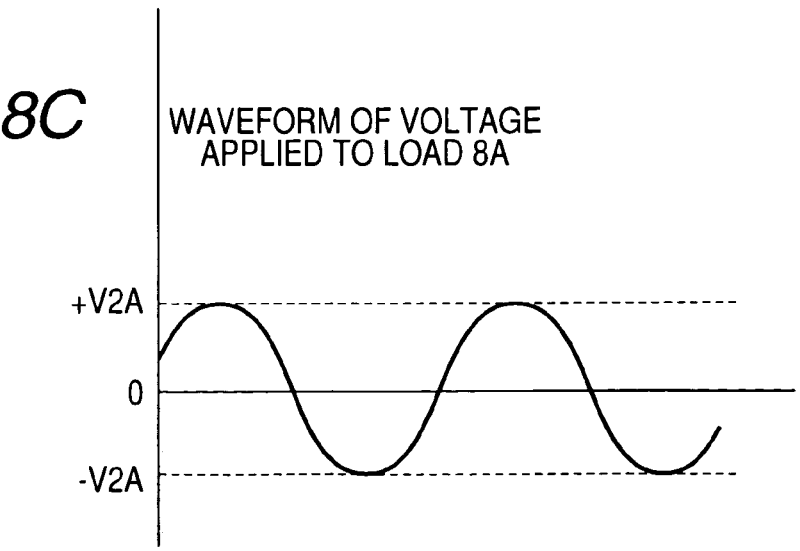
FIG. 8C is a graph schematically illustrating a waveform of a voltage applied to a load shown in FIG. 7.

This structure of the power supply circuit shown in FIG. 7 allows the DC voltage offset of the output voltage of the first chopper circuit 1A and that of the output voltage of the second chopper circuit 1B to be cancelled out. This results in that, as shown in FIG. 8C, when the voltage magnitudes of the first and second chopper circuits 1A and 1B are substantially the same as each other, and the output voltage of the first chopper circuit 1A and that of the second chopper circuit 1B have a 180° phase shift therebetween, the output voltage of the power supply circuit shown in FIG. 7 becomes a true AC voltage whose waveform is substantially sinusoidal with the peak-to-peak amplitude of 2VA.

In the first and second embodiments, the three-phase inverter circuit is described, but the present invention is not limited to the structure disclosed herein. Accordingly, a pair of chopper circuits can be used, whose output voltage waveforms have a 180° phase shift therebetween. Specifically, one waveform of the output voltage of one of the paired chopper circuits 1 is reversed in phase with the other waveform of the output voltage of the other of the paired chopper circuits. This permits a single-phase AC voltage to be applied to the load.

While there has been described what is at present considered to be these embodiments and modifications of the present invention, it will be understood that various modifications which are not described yet may be made therein, and it is intended to cover in the appended claims all such modifications as fall within the true spirit and scope of the invention.

What is claimed is:

1. A reversible buck-boost chopper circuit connected between a DC power source and a load, the circuit comprising:
    a first half-bridge circuit with a first output terminal comprising:
        a first switching element having a high-side main electrode connected to a positive electrode of the DC power source; and
        a second switching element connected to the first switching element in series at the first output terminal, the second switching element having a low-side main electrode connected to a negative electrode of the DC power source;
    a second half-bridge circuit with a second output terminal comprising:
        a third switching element having a high-side main electrode connected to a high-side terminal of the load and having no connection to the high-side main electrode of the first switching element; and
        a fourth switching element connected to the third switching element in series at the second output terminal, the fourth switching element having a low-side main electrode connected to a low-side terminal of the load and the negative electrode of the DC power source; and
    a reactor connected between the first output terminal of the first half-bridge circuit and the second output terminal of the second half-bridge circuit.

2. A reversible buck-boost chopper circuit according to claim 1, wherein each of the first to fourth switching elements has a control terminal, the chopper circuit further comprising:
    a control circuit connected to the control terminal of each of the first to fourth switching elements, and configured to turn on and off at least one of the first to fourth switching elements to produce an output voltage, thereby applying the output voltage to either the DC power source or the load.

3. A reversible buck-boost chopper circuit according to claim 2, wherein a first operation mode occurs when a first voltage across the load is higher than a second voltage across the DC power source, and wherein the control circuit is configured to turn on and off the fourth switching element based on a predetermined ON-duty in every predetermined switching cycle while keeping the first switching element on and the second switching element off.

4. A reversible buck-boost chopper circuit according to claim 2, wherein a second operation mode occurs when a first voltage across the load is higher than a second voltage across the DC power source, and wherein the control circuit is configured to turn on and off the first switching element based on a predetermined ON-duty every predetermined switching cycle while keeping the third switching element on and the fourth switching element off.

5. A reversible buck-boost chopper circuit according to claim 2, wherein a third operation mode occurs when a first voltage across the load is lower than a second voltage across the DC power source, and wherein the control circuit is configured to turn on and off the second switching element based on a predetermined ON-duty every predetermined switching cycle while keeping the third switching element on and the fourth switching element off.

6. A reversible buck-boost chopper circuit according to claim 2, wherein a fourth operation mode occurs when a first voltage across the load is higher than a second voltage across the DC power source, and wherein the control circuit is configured to turn on and off the third switching element based on a predetermined ON-duty every predetermined switching cycle while keeping the first switching element on and the second switching element off.

7. A reversible buck-boost chopper circuit according to claim 1, further comprising:
    a first voltage smoothing circuit connected in parallel to the DC power source and the first half-bridge circuit; and
    a second voltage smoothing circuit connected in parallel to the load and the second half-bridge circuit.

8. An inverter circuit connected between a DC power source and a load, the circuit comprising:
    first and second reversible buck-boost chopper circuits, each of the first and second reversible buck-boost chopper circuits comprising:
        a first half-bridge circuit with a first output terminal including a first switching element having a high-side main electrode connected to a positive electrode of the DC power source; and a second switching element connected to the first switching element in series at the first output terminal, the second switching element having a low-side main electrode connected to a negative electrode of the DC power source;
        a second half-bridge circuit with a second output terminal including a third switching element having a high-side main electrode-connected to a high-side terminal of the load and having no connection to the high-side main electrode of the first switching element; and a fourth switching element connected to the third switching element in series at the second output terminal, the fourth switching element having a low-side main electrode; and
        a reactor connected between the first output terminal of the first half-bridge circuit and the second output terminal of the second half-bridge circuit, wherein the high-side main electrode of the first reversible buck-boost chopper circuit is connected to a high-side terminal of the load, and the high-side main electrode of the second reversible buck-boost chopper circuit is connected to a low-side terminal of the load; and
    a control circuit connected to the control terminal of each of the first to fourth switching elements of each of the first and second reversible buck-boost chopper circuits, and configured to:
        turn on and off at least one of the first to fourth switching elements of the first reversible buck-boost chopper circuit to produce a first output voltage; and
        turn on and off at least one of the first to fourth switching elements of the second reversible buck-boost chopper circuit to produce a second output voltage, wherein the first output voltage is applied to the high-side terminal of the load, and the second output voltage is applied to the low-side terminal of the load.

9. An inverter circuit connected between a DC power source and a polyphase motor with polyphase windings, the circuit comprising:
    a plurality of reversible buck-boost chopper circuits, each of the plurality of reversible buck-boost chopper circuits comprising:

a first half-bridge circuit with a first output terminal including a first switching element having a high-side main electrode connected to a positive electrode of the DC power source; and a second switching element connected to the first switching element in series at the first output terminal, the second switching element having a low-side main electrode connected to a negative electrode of the DC power source;

a second half-bridge circuit with a second output terminal including a third switching element having a high-side main electrode and having no connection to the high-side main electrode of the first switching element; and a fourth switching element connected to the third switching element in series at the second output terminal, the fourth switching element having a low-side main electrode connected to the negative electrode of the DC power source; and a reactor connected between the first output terminal of the first half-bridge circuit and the second output terminal of the second half-bridge circuit, a the number of the reversible buck-boost chopper circuits being a positive integer multiple of a number of phase of the polyphase motor, and wherein each of the high-side main electrodes of the third switching elements of the plurality of the reversible buck-boost chopper circuits is connected to an end of at least one of the polyphase windings of the polyphase motor.

10. An inverter circuit according to claim 9, wherein the number of the reversible buck-boost chopper circuits is two or more times the number of phase of the polyphase motor, and turn-on timings of part of the reversible buck-boost chopper circuits that are connected to one common phase winding of the polyphase windings of the polyphase motor are sequentially shifted.

11. An inverter circuit according to claim 9, further comprising:

a control circuit connected to the control terminal of each of the first to fourth switching elements of each of the plurality of reversible buck-boost chopper circuits, and configured to:

turn on and off at least one of the first to fourth switching elements of the plurality of reversible buck-boost chopper circuits to produce an alternating current voltage whose waveform is substantially sinusoidal and an alternating current whose waveform is substantially sinusoidal for each phase of the polyphase motor.

12. An inverter circuit according to claim 9, further comprising:

a control circuit connected to the control terminal of each of the first to fourth switching elements of each of the plurality of reversible buck-boost chopper circuits, and configured to:

turn on and off at least one of the first to fourth switching elements of the plurality of reversible buck-boost chopper circuits to boost a voltage across the DC power source so as to apply the boosted voltage to the polyphase motor when the polyphase motor operates at its rated power.

13. An inverter circuit connected between a DC power source and a load, the circuit comprising:

a reversible buck-boost chopper circuit, the reversible buck-boost chopper circuit comprising:

a first half-bridge circuit with a first output terminal including a first switching element having a high-side main electrode connected to a positive electrode of the DC power source; and a second switching element connected to the first switching element in series at the first output terminal, the second switching element having a low-side main electrode connected to a negative electrode of the DC power source;

a second half-bridge circuit with a second output terminal including a third switching element having a high-side main electrode connected to a high-side terminal of the load and having no connection to the high-side main electrode of the first switching element; and a fourth switching element connected to the third switching element in series at the second output terminal, the fourth switching element having a low-side main electrode connected to a low-side terminal of the load and the negative electrode of the DC power source; and a reactor connected between the first output terminal of the first half-bridge circuit and the second output terminal of the second half-bridge circuit; and a control circuit connected to the control terminal of each of the first to fourth switching elements of the reversible buck-boost chopper circuit, and configured to:

turn on and off at least one of the first to fourth switching elements of the reversible buck-boost chopper circuit so as to cause the reversible buck-boost chopper circuit to serve as a DC to DC converter so that the reversible buck-boost chopper circuit produces a predetermined DC voltage, thereby applying the produced DC voltage to the load.

14. An inverter circuit according to claim 13, wherein the control circuit is configured to turn on and off at least one of the first to fourth switching elements of the reversible buck-boost chopper circuit so as to select the reversible buck-boost chopper circuit to serve as the DC to DC converter thereby applying the produced DC voltage to the load, or as an inverter to produces a predetermined AC voltage, thereby applying the produced AC voltage to the load.

* * * * *